US010717328B2

(12) United States Patent
Marsaly et al.

(10) Patent No.: US 10,717,328 B2
(45) Date of Patent: Jul. 21, 2020

(54) SYSTEM INCLUDING PRESSURIZED LOAD CELLS

(71) Applicant: HUTCHINSON S.A., Paris (FR)

(72) Inventors: Olivier Marsaly, Princeton, NJ (US); Lars Johan Resare, Ewing, NJ (US); Michael G. Hartman, Lansdale, PA (US); Olivier Noblanc, Levittown, PA (US); Florence Ratet, Parmain (FR)

(73) Assignee: HUTCHINSON S.A., Paris (FR)

( * ) Notice: Subject to any disclaimer, the term of this patent is extended or adjusted under 35 U.S.C. 154(b) by 831 days.

(21) Appl. No.: 14/629,089

(22) Filed: Feb. 23, 2015

(65) Prior Publication Data

US 2015/0239302 A1    Aug. 27, 2015

Related U.S. Application Data

(60) Provisional application No. 61/942,948, filed on Feb. 21, 2014.

(51) Int. Cl.
*B60C 17/01* (2006.01)
*B60C 5/24* (2006.01)
(Continued)

(52) U.S. Cl.
CPC .............. *B60C 17/01* (2013.01); *B60C 5/20* (2013.01); *B60C 5/24* (2013.01); *B60C 15/028* (2013.01);
(Continued)

(58) Field of Classification Search
CPC .. B60C 5/24; B60C 5/20; B60C 5/025; B60C 15/028; B60C 15/032; B60C 17/01;
(Continued)

(56) References Cited

U.S. PATENT DOCUMENTS 523,314 A * 7/1894 Jeffery .................. B60C 15/028
152/400
563,823 A * 7/1896 Veazie ................... 152/334.1 X
(Continued)

FOREIGN PATENT DOCUMENTS

EP       0 020 150 A1 * 12/1980  ............. B60C 17/01
FR       571.246 A   *  5/1924  ............... B60C 5/20
(Continued)

OTHER PUBLICATIONS

Mechanics of Pneumatic Tires, ed. Samuel Clark, US Department of Transportation, Aug. 1981, p. 211.*
(Continued)

*Primary Examiner* — Adrienne C. Johnstone
(74) *Attorney, Agent, or Firm* — The Webb Law Firm

(57) ABSTRACT

A system. The system includes a wheel, a tire, a plurality of pressurized load cells and a sleeve member. The wheel includes a first flange portion, a second flange portion and a barrel portion positioned between the first and second flange portions. The tire is mounted to the wheel. The wheel and the tire cooperate to define a tire cavity. The tire includes a first beaded portion and a second beaded portion. The plurality of pressurized load cells are positioned within the tire cavity. The sleeve member is positioned within the tire cavity and surrounds and constrains the plurality of pressurized load cells.

2 Claims, 18 Drawing Sheets

(51) Int. Cl.
  *B60C 5/20* (2006.01)
  *B60C 15/028* (2006.01)
(52) U.S. Cl.
  CPC .. *Y10T 152/1054* (2015.01); *Y10T 152/10558* (2015.01); *Y10T 152/10576* (2015.01); *Y10T 152/10594* (2015.01)
(58) Field of Classification Search
  CPC ... B60C 17/02; B60C 5/22; Y10T 152/10558; Y10T 152/1054; Y10T 152/10522; Y10T 152/10549; Y10T 152/10567; Y10T 152/10585; Y10T 152/10576; Y10T 152/10594; Y10T 152/10603; Y10T 152/10612
  USPC ....... 152/331.1, 333.1–338.1, 399–401, 518, 152/519, 339.1, 340.1, 341.1, 342.1
  See application file for complete search history.

(56) References Cited

U.S. PATENT DOCUMENTS

| | | | |
|---|---|---|---|
| 575,797 A * | 1/1897 | Welch | B60C 5/24 152/336.1 X |
| 710,793 A * | 10/1902 | Mitchell | B60C 5/20 152/331.1 |
| 754,648 A * | 3/1904 | Fiske | 152/401 X |
| 799,859 A * | 9/1905 | Magowan | B60C 5/24 152/336.1 X |
| 881,909 A * | 3/1908 | Drake | 152/336.1 |
| 906,404 A * | 12/1908 | Foucart | 152/401 X |
| 912,725 A * | 2/1909 | Paynter | 152/334.1 |
| 963,320 A * | 7/1910 | Peck | 152/336.1 X |
| 1,000,069 A * | 8/1911 | Brower | 152/337.1 |
| 1,101,828 A * | 6/1914 | Baillard | 152/337.1 |
| 1,207,894 A * | 12/1916 | Geyer | 152/400 X |
| 1,243,513 A * | 10/1917 | Grubb | B60C 5/24 152/336.1 X |
| 1,250,633 A * | 12/1917 | Oetter | B60C 15/028 152/401 |
| 1,260,304 A * | 3/1918 | Betham | 152/337.1 |
| 1,303,998 A * | 5/1919 | Von Trott | 152/337.1 |
| 1,334,205 A * | 3/1920 | Williams | B60C 5/20 152/331.1 X |
| 1,406,324 A * | 2/1922 | Amoroso | 152/337.1 |
| 1,424,824 A * | 8/1922 | Johnson | 152/337.1 |
| 1,472,913 A * | 11/1923 | Jones | 152/401 |
| 1,626,511 A * | 4/1927 | Clark | B60C 17/01 152/340.1 |
| 1,626,512 A * | 4/1927 | Clark | B60C 17/01 152/340.1 |
| 1,886,094 A * | 11/1932 | Guenard | 152/337.1 |
| 2,045,341 A * | 6/1936 | Bourdon | B60C 17/01 152/340.1 |
| 2,155,206 A | 4/1939 | Steindel | |
| 2,244,941 A * | 6/1941 | Degnen | B60C 5/20 152/341.1 |
| 2,524,808 A * | 10/1950 | Khalil | B60C 5/20 152/340.1 |
| 3,191,654 A * | 6/1965 | Anderson et al. | B60C 17/01 152/341.1 |
| 3,256,123 A * | 6/1966 | Hart | B60C 5/20 |
| 3,421,535 A * | 1/1969 | Hawkes | 152/341.1 X |
| 4,054,169 A | 10/1977 | Devienne et al. | |
| 4,293,017 A * | 10/1981 | Lambe | 152/339.1 |
| 5,894,874 A * | 4/1999 | Yamagiwa | B60C 17/066 152/336.1 X |
| 2005/0202193 A1 | 9/2005 | Summers | |
| 2005/0257869 A1 | 11/2005 | Rumbaugh | |
| 2007/0113945 A1* | 5/2007 | Vervaet | B60C 17/02 152/518 |

FOREIGN PATENT DOCUMENTS

| | | | | |
|---|---|---|---|---|
| FR | 350.878 A | * | 6/1950 | ............ B60C 5/025 |
| FR | 2.147.884 A | * | 3/1973 | ............ B60C 17/01 |
| GB | 602502 A | * | 5/1948 | ............ B60C 5/24 |
| GB | 2 007 168 A | * | 5/1979 | |
| JP | 2008308125 A | | 12/2008 | |
| KR | 20080081217 A | | 9/2008 | |

OTHER PUBLICATIONS

International Search Report for corresponding International Application No. PCT/US2015/017135, dated Jun. 8, 2015.
Written Opinion for corresponding International Application No. PCT/US2015/017135, dated Jun. 8, 2015.
International Preliminary Report on Patentability dated Aug. 23, 2016 for corresponding International Application PCT/US2015/017135.

* cited by examiner

SYSTEM INCLUDING PRESSURIZED LOAD CELLS

CROSS-REFERENCE TO RELATED APPLICATION

This application claims the benefit under 35 U.S.C. § 119(e) of the earlier filing date of U.S. Provisional Patent Application No. 61/942,948 filed on Feb. 21, 2014, the contents of which are hereby incorporated by reference in their entirety.

BACKGROUND

This application discloses an invention which is related, generally and in various embodiments, to a system which includes pressurized load cells.

Pressurized load cells have been utilized with tire/wheel combinations for a variety of vehicles including automobiles, motorcycles and all-terrain vehicles. For a given tire and wheel combination of a vehicle, the pressurized load cells (1) fill the void between the barrel of the wheel and the interior surface of the tire and (2) operate to maintain the tire load deflection or loaded ratio if the tire experiences a complete loss of pressure, and thus help the vehicle maintain control and mobility.

Despite the potential advantages of using pressurized load cells with tire/wheel combinations, the use of pressurized load cells with tire wheel combinations has been severely limited. The limited use is generally attributed to (1) the inefficiencies and difficulties associated with the pressurized load cells installation process and (2) the limited "give" of a tire having pressurized load cells positioned within the tire cavity.

Regarding the installation process, each load cell is typically partially inflated, then inserted one-by-one into the cavity of the tire until the cavity is filled with the partially inflated load cells (the partially inflated load cells form a substantially continuous ring). Next, each of the load cells is brought up to a higher pressure which is common to all of the load cells. The tire, which has the pressurized load cells positioned in its cavity, is then mounted to the wheel. The installation process requires a lot of steps, is relatively time consuming, is very susceptible to one or more of the load cells moving out of position or even falling out of the tire cavity before the tire is mounted to the wheel, and is generally not feasible for a high volume application.

Regarding the limited "give" of a tire having pressurized load cells positioned within the tire cavity, the pressurized load cells occupy a certain volume of the tire cavity. As the tire pressure drops, the ability of the tire to "flatten" and increase the amount of external surface area of the tire in contact with the ground is limited not only by the deflection of the tire, but also by the deflection of the pressurized load cells. Due to the limited "give" of such tire/wheel combinations, there are not well-suited for applications which require substantial deflection of the tire (e.g., climbing an obstacle like a vertical step which is taller than ⅓ of the outside diameter of the tire).

BRIEF SUMMARY OF THE INVENTION

A system is disclosed. The system includes a multi-piece wheel, a tire, an assembly and a sleeve member. The multi-piece wheel includes a first piece which includes a first flange portion, a second piece which includes a second flange portion, and a barrel portion positioned between the first and second flange portions. The tire is mounted to the wheel and includes a first beaded portion and a second beaded portion. The wheel and the tire cooperate to define a tire cavity. The assembly includes a beadlock and a plurality of pressurized load cells connected to and in contact with the beadlock. The assembly is positioned within the tire cavity. The beadlock is in contact with the multi-piece wheel and the first and second beaded portions of the tire. A first one of the pressurized load cells is in contact with a second one of the pressurized load cells. The sleeve member is positioned within the tire cavity and surrounds and constrains the plurality of pressurized load cells.

BRIEF DESCRIPTION OF THE DRAWINGS

The novel features of the embodiments described herein are set forth with particularity in the appended claims. The embodiments, however, both as to organization and methods of operation may be better understood by reference to the following description, taken in conjunction with the accompanying drawings.

DETAILED DESCRIPTION

Figure 1A:
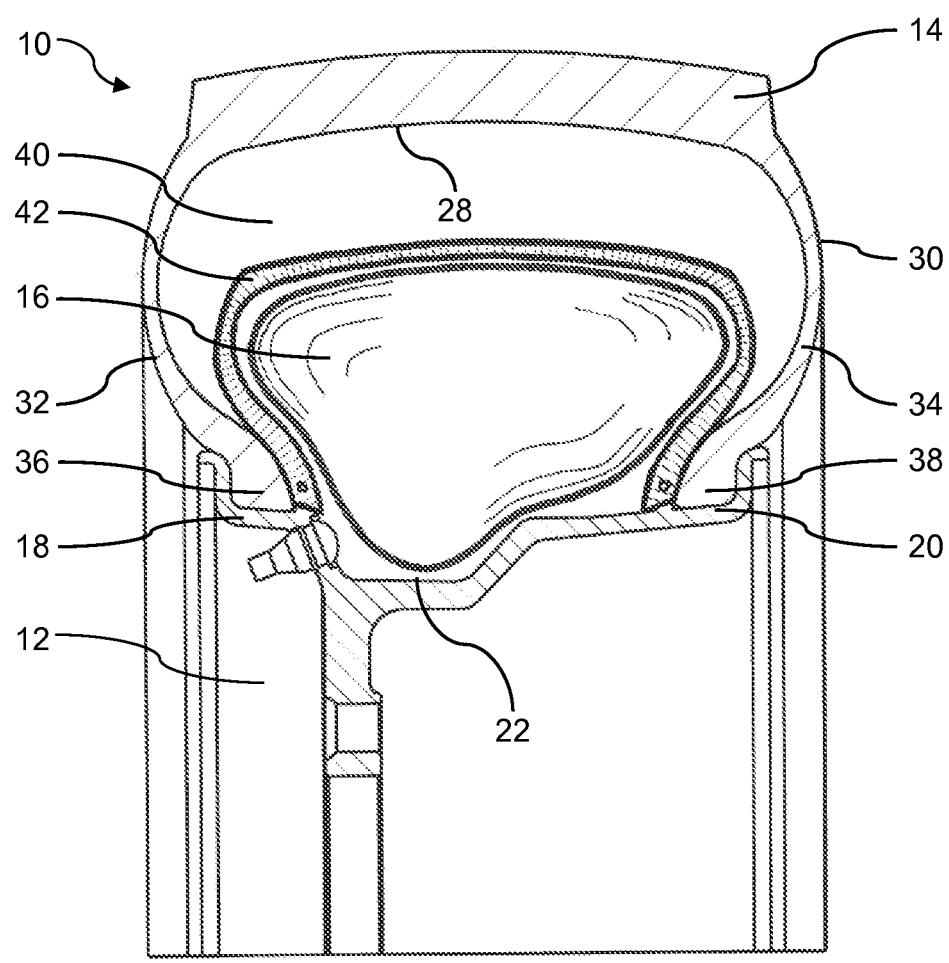
FIGS. 1A and 1B illustrate various embodiments of a system which includes pressurized load cells.

It is to be understood that at least some of the figures and descriptions of the invention have been simplified to illustrate elements that are relevant for a clear understanding of the invention, while eliminating, for purposes of clarity, other elements that those of ordinary skill in the art will appreciate may also comprise a portion of the invention. However, because such elements are well known in the art, and because they do not facilitate a better understanding of the invention, a description of such elements is not provided herein.

In the following detailed description, reference is made to the accompanying drawings, which form a part hereof. In the drawings, similar symbols and reference characters typically identify similar components throughout several views, unless context dictates otherwise. The illustrative embodiments described in the detailed description, drawings and claims are not meant to be limiting. Other embodiments may be utilized, and other changes may be made, without departing from the scope of the technology described herein.

The following description of certain examples of the technology should not be used to limit its scope. Other examples, features, aspects, embodiments and advantages of the technology will become apparent to those skilled in the art from the following description, which is by way of illustration, one of the best modes contemplated for carrying out the technology. As will be realized, the technology described herein is capable of other different and obvious aspects, all without departing from the technology. Accordingly, the drawings and descriptions should be regarded as illustrative in nature and not restrictive.

It is further understood that any one or more of the teachings, expressions, embodiments, examples, etc. described herein may be combined with any one or more of the other teachings, expressions, embodiments, examples, etc. that are described herein. The following described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Before explaining the various embodiments of the pressurized load cell system in detail, it should be noted that the various embodiments disclosed herein are not limited in their application or use to the details of construction and arrangement of parts illustrated in the accompanying drawings and description. Rather, the disclosed embodiments may be positioned or incorporated in other embodiments, variations and modifications thereof, and may be practiced or carried out in various ways. Accordingly, embodiments of the pressurized load cell system disclosed herein are illustrative in nature and are not meant to limit the scope or application thereof. Furthermore, unless otherwise indicated, the terms and expressions employed herein have been chosen for the purpose of describing the embodiments for the convenience of the reader and are not meant to limit the scope thereof. In addition, it should be understood that any one or more of the disclosed embodiments, expressions of embodiments, and/or examples thereof, can be combined with any one or more of the other disclosed embodiments, expressions of embodiments, and/or examples thereof, without limitation.

Also, in the following description, it is to be understood that terms such as outward, inward, above and the like are words of convenience and are not to be construed as limiting terms. Terminology used herein is not meant to be limiting insofar as devices described herein, or portions thereof, may be attached or utilized in other orientations. The various embodiments will be described in more detail with reference to the drawings.

Figure 1B:
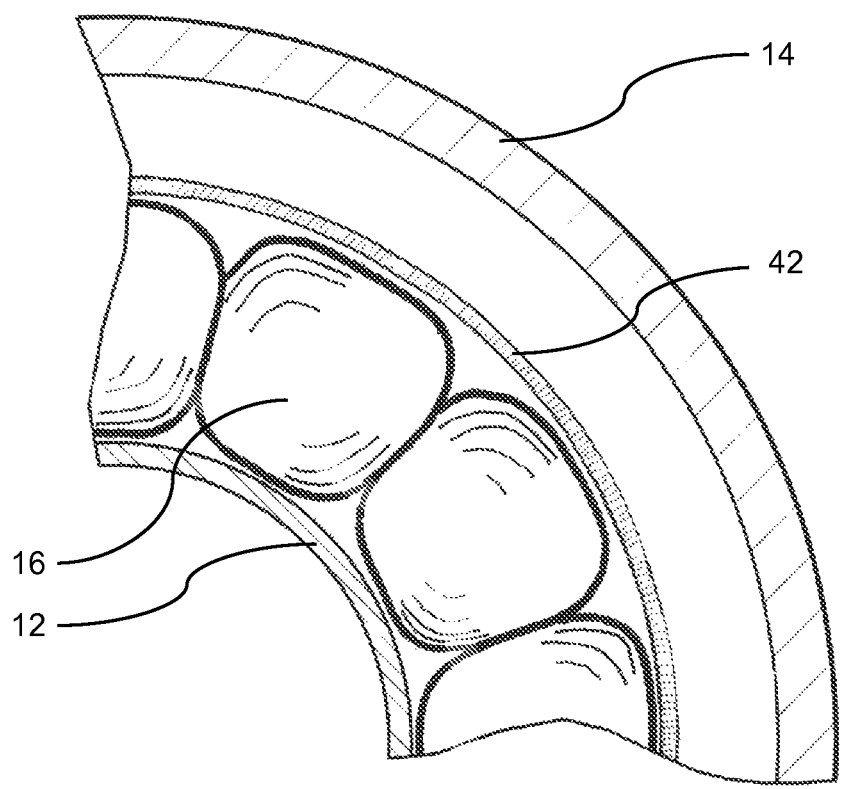

FIG. 1A illustrates various embodiments of a system 10. The system 10 includes a wheel 12, a tire 14, and a plurality of pressurized load cells 16. FIG. 1B is a cross section of the system 10 of FIG. 1A, and for purposes of simplicity, many of the details of the wheel 12 are not shown in FIG. 1B.

The wheel 12 may be any suitable type of wheel (e.g., a single piece wheel, a two-piece, a multi-piece wheel), may be fabricated from any suitable material (e.g., steel, aluminum, an alloy), and may be of any suitable size and shape. Therefore, although a single piece wheel is shown in FIGS. 1A and 1B for purposes of simplicity, it will be appreciated that the wheel 12 may be a wheel other than a single piece wheel. In general, the wheel 12 includes a first flange portion 18, a second flange portion 20, and a barrel portion 22 between the first and second flange portions 18, 20. Although not shown in FIGS. 1A and 1B for purposes of simplicity, it will be appreciated that the wheel 12 defines a central opening 24 and an axis of rotation, and also includes a transverse wall section 26 which extends from the central opening 24 toward the barrel portion 22 of the wheel 12. The central opening 24 and the transverse wall section 26 are shown partially, for example, in FIG. 2A.

The tire 14 is sized to be mounted on the wheel 12, and may be fabricated in any suitable configuration from any suitable combination of materials (e.g., rubber, steel belts, nylon belts, rayon body plies, etc.). The tire 14 includes an interior surface 28, an exterior surface 30, a first sidewall portion 32 and a second sidewall portion 34. The first sidewall portion 32 includes a first beaded portion 36 and the second sidewall portion 34 includes a second beaded portion 38. When the tire 14 is mounted to the wheel 12, the first beaded portion 36 of the tire 14 is set against the first flange portion 18 of the wheel 12 and the second beaded portion 38 of the tire 14 is set against second flange portion 20 of the wheel 12 as is known in the art. The combination of the wheel 12 and the tire 14 define a tire cavity 40.

The pressurized load cells 16 may be of any suitable size and shape, and may be fabricated from any suitable material. For example, according to various embodiments, the pressurized load cells 16 can be fabricated from a polyurethane material, a rubber material, etc. According to various embodiments, in order to maintain their shape, the pressurized load cells 16 can be made from sheet stock, or of a preformed material and/or are reinforced. As described in more detail hereinafter (See, e.g., FIG. 7A), according to various embodiments, each pressurized load cell 16 may incorporate a valve member which allows the adjustment of the air pressure in the pressurized load cell 16 (both inflation and deflation). According to other embodiments, the valve member may be configured as a check valve to only allow the pressurized load cell 16 to inflate. For such embodiments, the pressurized load cells 16 may be configured to maintain ambient pressure or the highest pressure that the tire 14 was inflated to.

As shown in FIG. 1A, the pressurized load cells 16 are positioned within the tire cavity 40 radially outward from the barrel portion 22 of the wheel 12 and between the first and second beaded portions 36, 38 of the tire 14, and are sized to fill only a portion of the tire cavity 40. In other words, for the embodiments of FIGS. 1A and 1B, the pressurized load cells 16 partially fill the tire cavity 40. Although the pressurized load cells 16 are shown in FIGS. 1A and 1B as being of a certain configuration, it will be appreciated that the pressurized load cells 16 may be fabricated in other configurations (e.g., spherical, elliptical, irregular, etc.). Also, although only partially shown in FIGS. 1A and 1B for purposes of simplicity, it will be appreciated that the pressurized load cells 16 are positioned inside the tire cavity 40 around the entire circumference of the wheel 12. According to various embodiments, the pressurized load cells 16 are arranged as a substantially continuous ring inside the tire cavity 40 and around the circumference of the wheel 12 as partially shown in FIG. 1B. According to other embodiments, the pressurized load cells 16 are arranged in a pattern other than a substantially continuous ring inside the tire cavity 40 and around the circumference of the wheel 12. For example, according to various embodiments, the pressurized load cells 16 are distributed equally inside the tire cavity 40 and around the circumference of the wheel 12 in a paddle wheel pattern where there is a spacing (e.g., a fixed spacing) between adjacent pressurized load cells 16. It will be appreciated that such a pattern of pressurized load cells 16 can function similarly to a knob on a tire tread and improve the ability of the tire 14 to climb a tall obstacle.

As shown in FIGS. 1A and 1B, the system 10 may also include a tube or sleeve member 42 that is positioned within the tire cavity 40, partially surrounds the plurality of pressurized load cells 16 and helps to constrain the pressurized load cells 16 in a desired position within the tire cavity 40 (e.g., a position where the pressurized load cells 16 are radially inward some distance from the radially outermost portion of the interior surface 28 of the tire 14). For the embodiments of FIGS. 1A and 1B, the tube or sleeve member 42 is positioned radially outward from (or in contact with) the barrel portion 22 of the wheel 12 and is in contact with the interior surface 28 of the tire 14, including the interior surface 28 of the tire 14 at the first and second beaded portions 36, 38 of the tire 40. The tube or sleeve member 42 provides support on three "sides" of the pressurized load cells 16—on the axial outboard side (the left side of FIG. 1A), on the axial inboard side (the right side of FIG. 1A) and on the radial outboard side. The wheel 12 provides support on the radial inboard side of the pressurized load cells 16. The tube or sleeve member 42 may be fabricated from any suitable material. For example, according to various embodiments the tube or sleeve member 42 is made of a preformed material having a high flexural modulus. For such embodiments, the sleeve member 42 can be flexible, but non-stretchable.

According to various embodiments, the tube or sleeve member 42 is permanently attached to or connected to the pressurized load cells 16 to form a sub-assembly, and may also incorporate a valve member (not shown for purposes of clarity). For embodiments where the respective pressurized load cells 16 incorporate check valves and the tube or sleeve member 42 incorporates the above-referenced valve member, when the sub-assembly is installed within the tire cavity 40, the tube or sleeve member 42 and the pressurized load cells 16 will inflate to ambient pressure. Once the tire 14 is mounted to the wheel 12 and the tire cavity 40 is inflated, the pressurized load cells 16 will inflate to the same pressure as the inflated tire cavity 40.

Figure 2A:
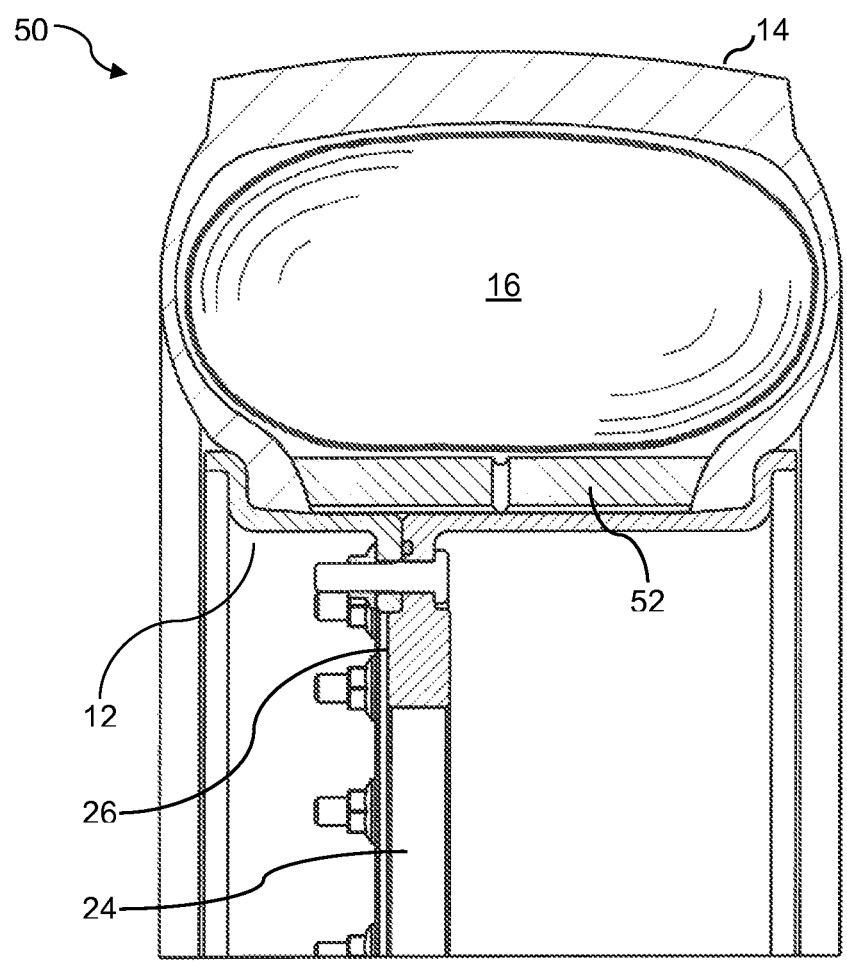
FIGS. 2A and 2B illustrate various embodiments of a system which includes a bead lock and pressurized load cells.
Figure 2B:
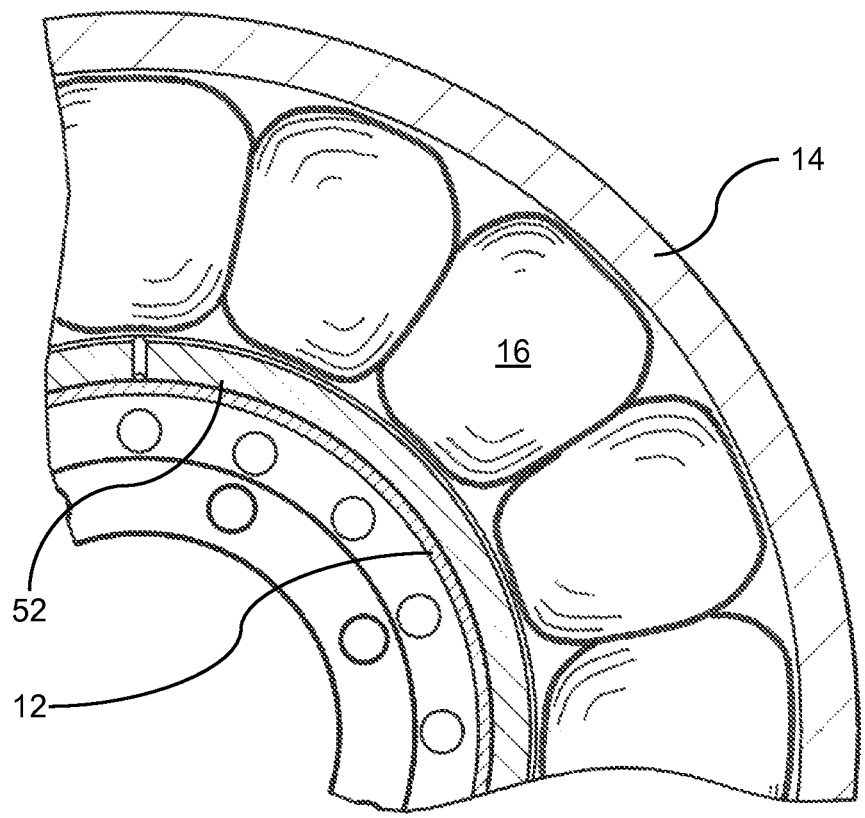

FIG. 2A illustrates various embodiments of a system 50 and FIG. 2B is a cross section of the system 50 of FIG. 2A. For purposes of simplicity, many of the details of the wheel 12 are not shown in FIG. 2B. The system 50 is similar to the system 10 of FIG. 1A in that it includes a wheel 12, a tire 14 and a plurality of pressurized load cells 16, but is different in several ways.

First, the wheel 12 of the system 50 is shown as a two-piece wheel (although other embodiments of the system 50 may include a multi-piece wheel other than a two-piece wheel). Second, the system 50 includes a bead lock 52 positioned radially outward from the barrel portion 22 of the wheel 12 and between the first and second beaded portions 36, 38 of the tire 14. Third, the pressurized load cells 16 are positioned radially outward from the bead lock 52 and are sized to substantially fill the tire cavity 40. Fourth, although the tube or sleeve member 42 can be included in these embodiments, the tube or sleeve member 42 may be eliminated as shown in FIGS. 2A and 2B because the interior surface 28 of the tire 14 provides the support on the three sides of the pressurized load cells 16—on the axial outboard side (the left side of FIG. 2A, the axial inboard side (the right side of FIG. 2A) and on the radial outboard side. For embodiments which include the tube or sleeve member 42, the tube or sleeve member 42 may also be attached or connected to the bead lock 52.

The bead lock 52 provides support on the radial inboard side of the pressurized load cells 16 and the wheel 12 provides support for the bead lock 52. The bead lock 52 may be of any suitable size and shape, and may be fabricated from any suitable material. Thus, although the bead lock 52 is shown in FIG. 2A as being of a particular configuration, it will be appreciated that according to other embodiments the bead lock 52 can be of a configuration other than that shown in FIG. 2A. The bead lock 52 is useful for helping to keep the tire 14 set tight against the first and second flange portions 18, 20 of the wheel 12, and is also helpful in keeping the pressurized load cells 16 contained inside the tire cavity 40 during service and/or mounting of the tire 14 onto the wheel 12. According to various embodiments, the pressurized load cells 16 may be connected to the bead lock 52 to create a sub-assembly. Additionally, for such embodiments, a central inflation manifold (not shown) can be used to pressurize or change the pressure in each pressurized load cell 16 from a single point.

Figure 3A:
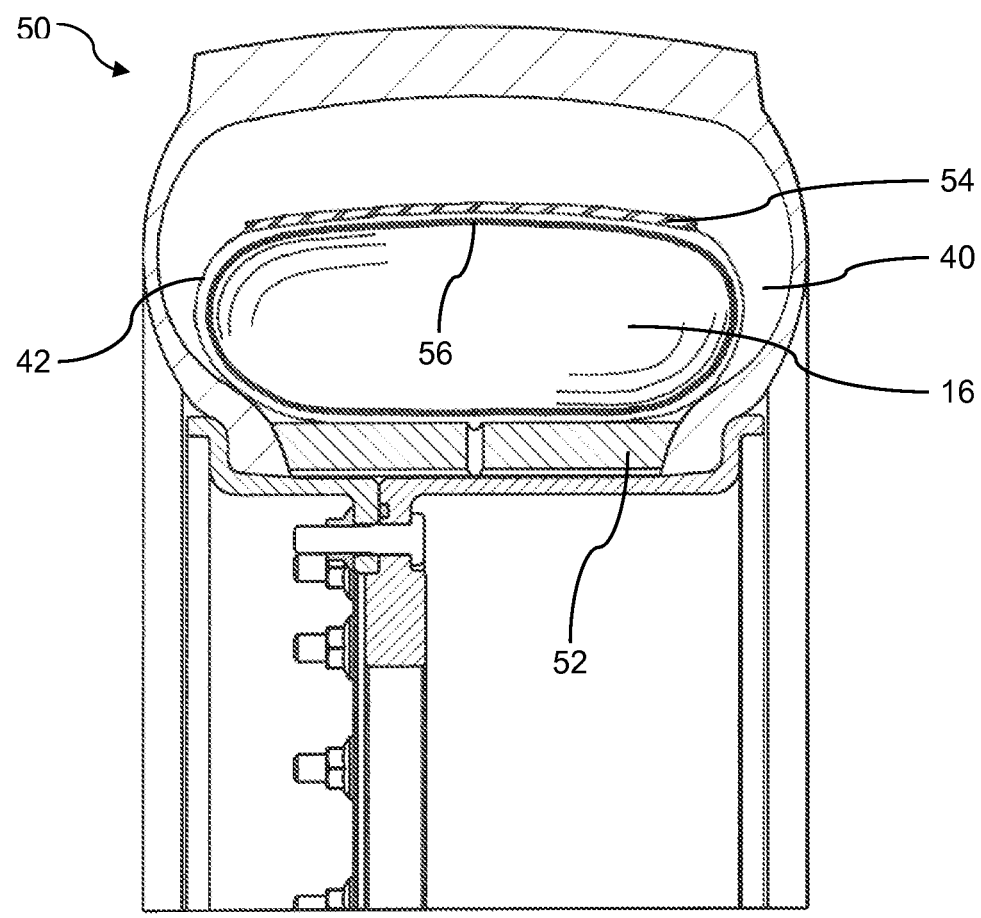
FIGS. 3A and 3B illustrate other embodiments of a system which includes a bead lock and pressurized load cells.
Figure 3B:
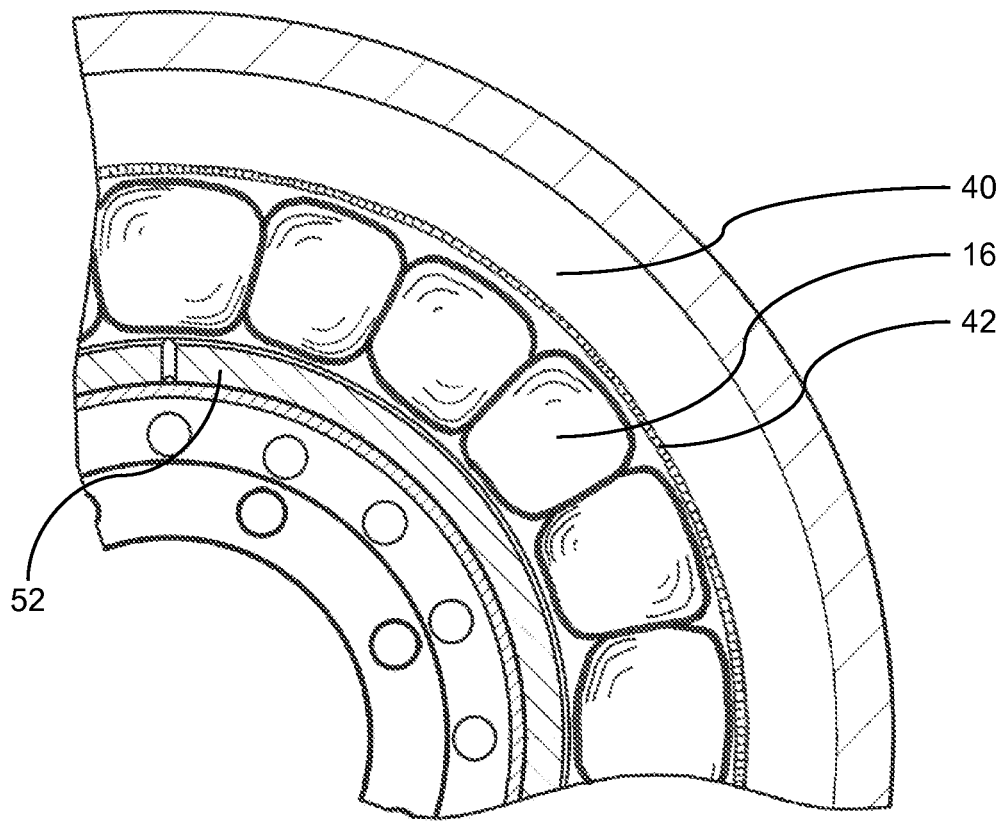

FIG. 3A illustrates other embodiments of the system 50 and FIG. 3B is a cross section of the system 50 of FIG. 3A. For purposes of simplicity, many of the details of the wheel 12 are not shown in FIG. 3B. The system 50 of FIG. 3A is similar to the system 50 shown in FIG. 2A in that it includes a wheel 12, a tire 14 and a plurality of pressurized load cells 16, but is different in several ways.

First, the pressurized load cells 16 are sized to fill only a portion of the tire cavity 40. In other words, for the embodiments of FIGS. 3A and 3B, the pressurized load cells 16 only partially fill the tire cavity 40. Second, the system 50 includes the tube or sleeve 42 member. For the embodiments of FIGS. 3A and 3B, the tube or sleeve member completely surrounds the plurality of pressurized load cells 16 and helps to constrain the pressurized load cells 16 in a desired position within the tire cavity 40. For these embodiments, the tube or sleeve member 42 provides the support on all sides of the pressurized load cells 16—on the axial outboard side (the left side of FIG. 3A, the axial inboard side (the right side of FIG. 3A), on the radial inboard side and on the radial outboard side. Third, the system 50 also includes a reinforcing band 54 connected to a radially outermost surface 56 of the tube or sleeve member 42. The reinforcing band 54 may be connected to the tube or sleeve member 42 in any suitable manner. According to various embodiments, the reinforcing band 54 is integral with the tube or sleeve 42 member. The combination of the tube or sleeve member 42 and the reinforcing band 54 operates to secure the position of the pressurized load cells 16 relative to the bead lock 52 and the tire 14. The reinforcing band 54 helps to further constrain the pressurized load cells 16 from moving radially outward from the bead lock 52.

Figure 4A:
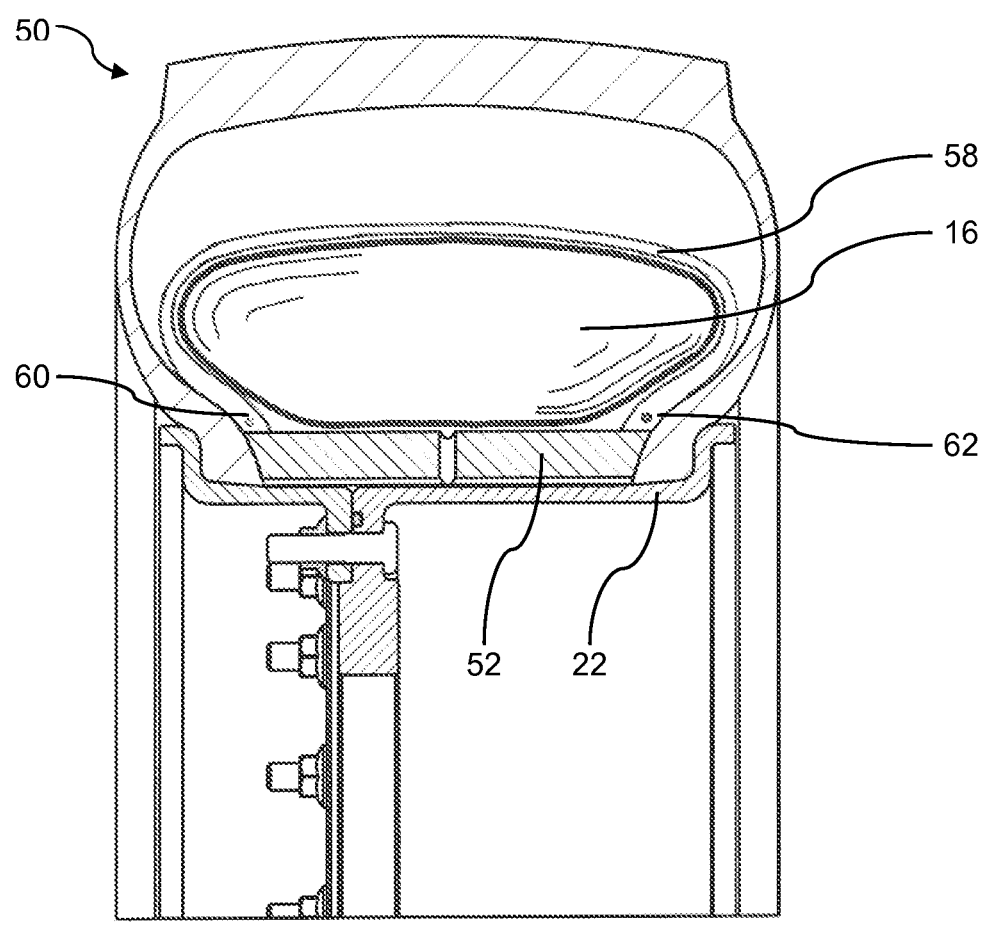
FIGS. 4A and 4B illustrate yet other embodiments of a system which includes a bead lock and pressurized load cells.
Figure 4B:
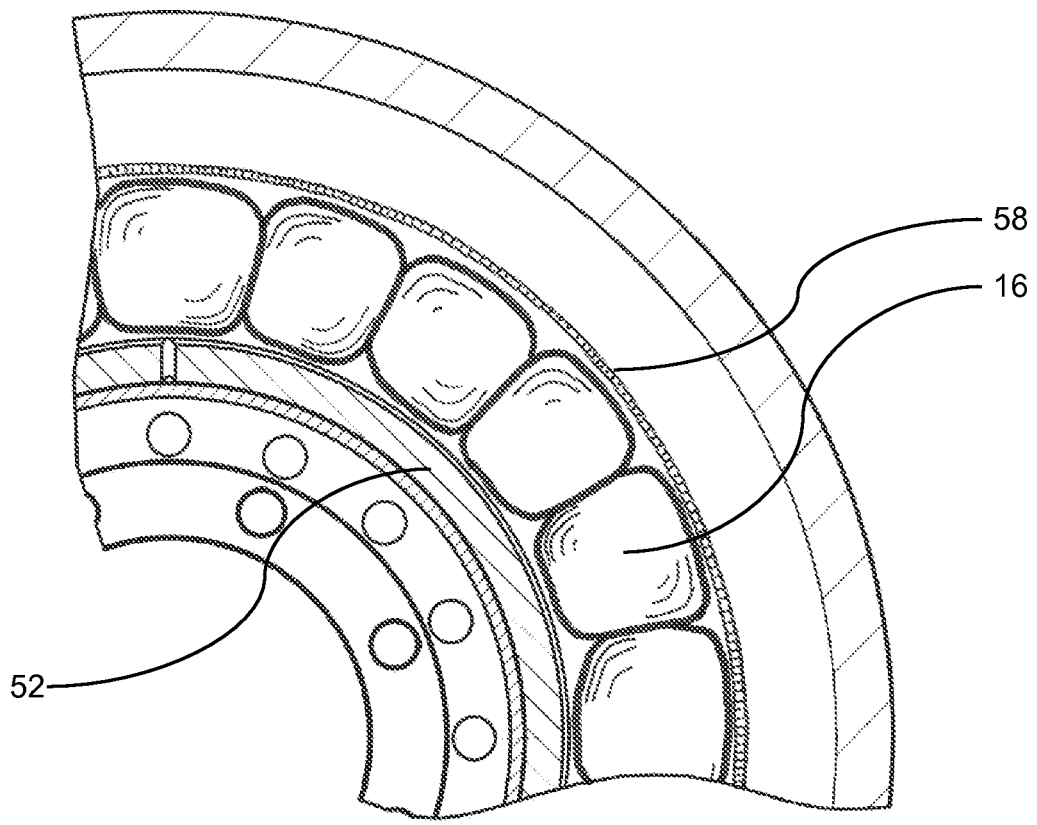

FIG. 4A illustrates yet other embodiments of the system 50 and FIG. 4B is a cross section of the system 50 of FIG. 4A. For purposes of simplicity, many of the details of the wheel 12 are not shown in FIG. 4B. The system 50 of FIG. 4A is similar to the system 50 shown in FIG. 3A in that it includes a wheel 12, a tire 14 and a plurality of pressurized load cells 16, but is different in that it includes a containment member 58 in lieu of the tube or sleeve member 42 and the reinforcing band 54. The containment member 58 provides the same type of functionality of the tube or sleeve member 42 and thus may be considered to be another embodiment of the tube or sleeve member 42.

The containment member 58 may be fabricated from any suitable material or combination of materials, only partially surrounds the pressurized load cells 16 and includes a first beaded portion 60 and a second beaded portion 62. The containment member 58 is similar to the sleeve or tube member 42 of FIG. 1A, but is different in that the containment member 58 is positioned radially outward from (or in contact with) the bead lock 52 and is in contact with the interior surface 28 of the tire 14, but not necessarily in contact with the interior surface 28 of the tire 14 at the first and second beaded portions 36, 38 of the tire 40. The containment member provides support on three sides of the pressurized load cells 16—on the axial outboard side (the left side of FIG. 4A), the axial inboard side (the right side of FIG. 4A) and on the radial outboard side. The bead lock 52 provides support on the radial inboard side of the pressurized load cells 16 and the wheel 12 provides support for the bead lock 52. The first and second beaded portions 60, 62 make the containment member 58 similar to a typical tire, and help to constrain the position of the containment member 58 (and the positions of the pressurized load cells 16 surrounded by the containment member 58) relative to the other components of the system 50.

Figure 5A:
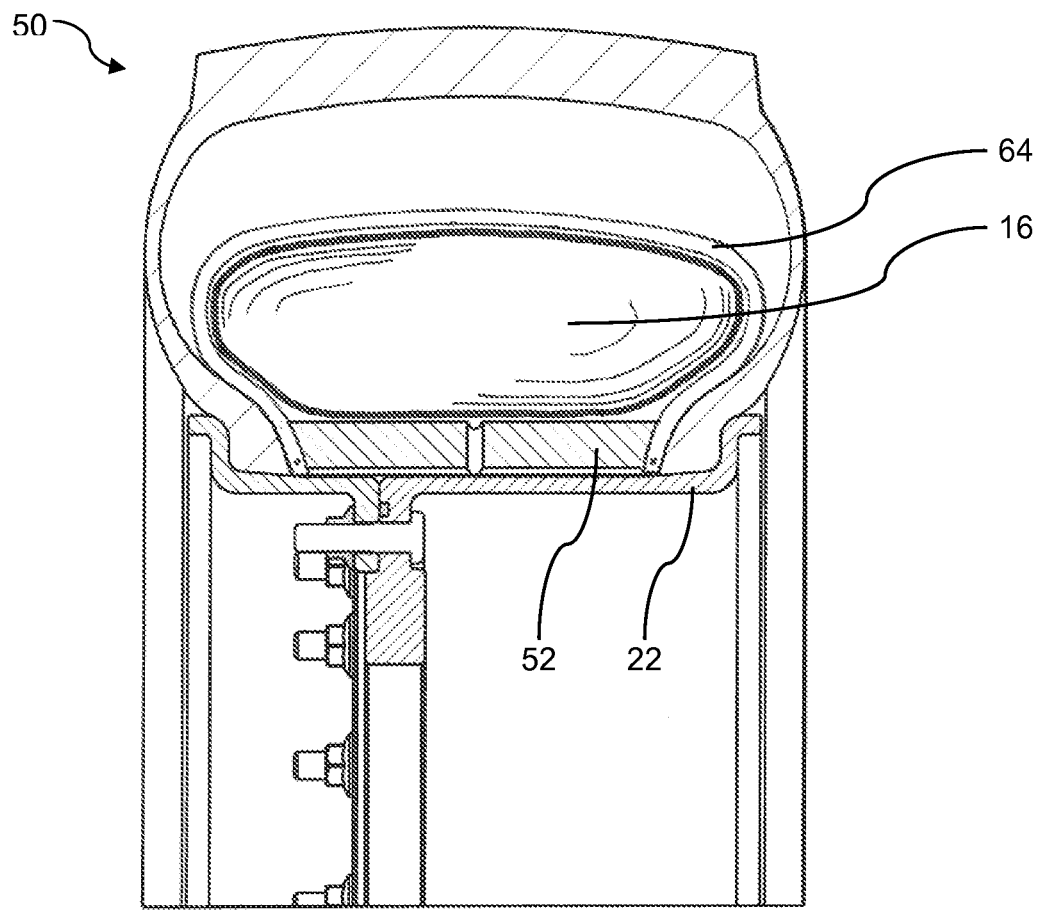
FIGS. 5A and 5B illustrate yet other embodiments of a system which includes a bead lock and pressurized load cells.
Figure 5B:
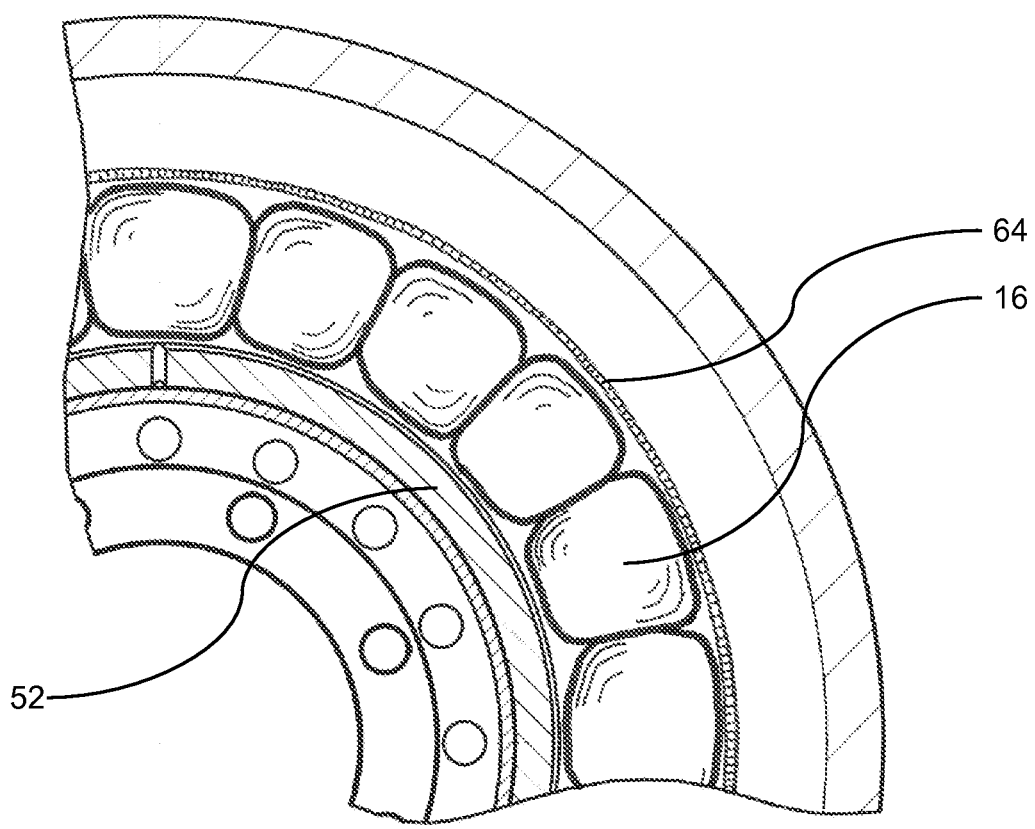

FIG. 5A illustrates yet other embodiments of the system 50 and FIG. 5B is a cross section of the system 50 of FIG. 5A. For purposes of simplicity, many of the details of the wheel 12 are not shown in FIG. 5B. The system 50 of FIG. 5A is similar to the system 50 shown in FIG. 4A in that it includes a wheel 12, a tire 14 and a plurality of pressurized load cells 16, but is different in that the system 50 of FIGS. 5A and 5B includes a flexible channel member 64 in lieu of the containment member 58. The flexible channel member 64 provides the same type of functionality of the tube or sleeve member 42 and thus may be considered to be another embodiment of the tube or sleeve member 42.

The flexible channel member 64 is positioned radially outward from (or in contact with) the barrel portion 22 of the wheel 12 and is positioned between the bead lock 52 and the first and second beaded portions 36, 38 of the tire 14. The flexible channel member 64 only partially surrounds the pressurized load cells 16 and may be fabricated from any suitable material or combination of materials. For example, according to various embodiments, the flexible channel member 64 is fabricated from a urethane reinforced with a nylon webbing. The flexible channel member 64 provides support on three sides of the pressurized load cells 16—on the axial outboard side (the left side of FIG. 5A), the axial inboard side (the right side of FIG. 5A) and on the radial outboard side. The bead lock 52 provides support on the radial inboard side of the pressurized load cells 16 and the wheel 12 provides support for the bead lock 52.

Figure 6A:
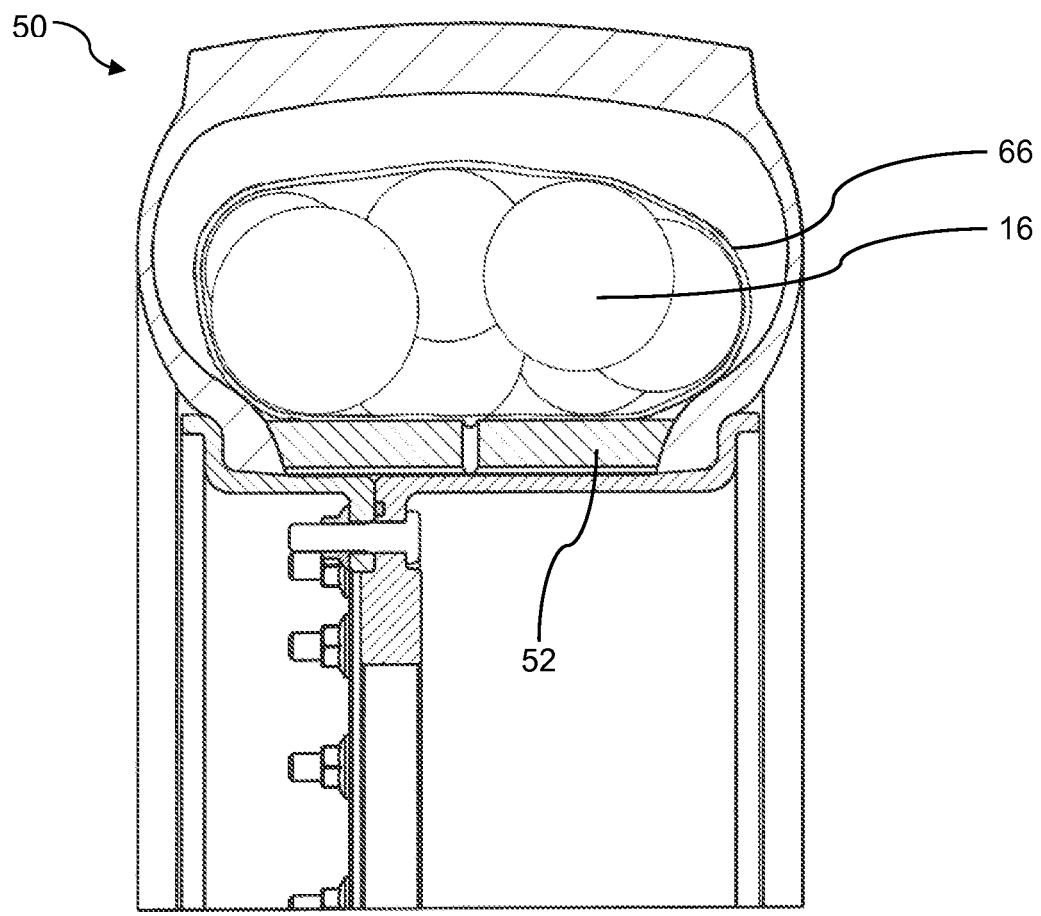
FIGS. 6A and 6B illustrate yet other embodiments of a system which includes a bead lock and pressurized load cells.
Figure 6B:
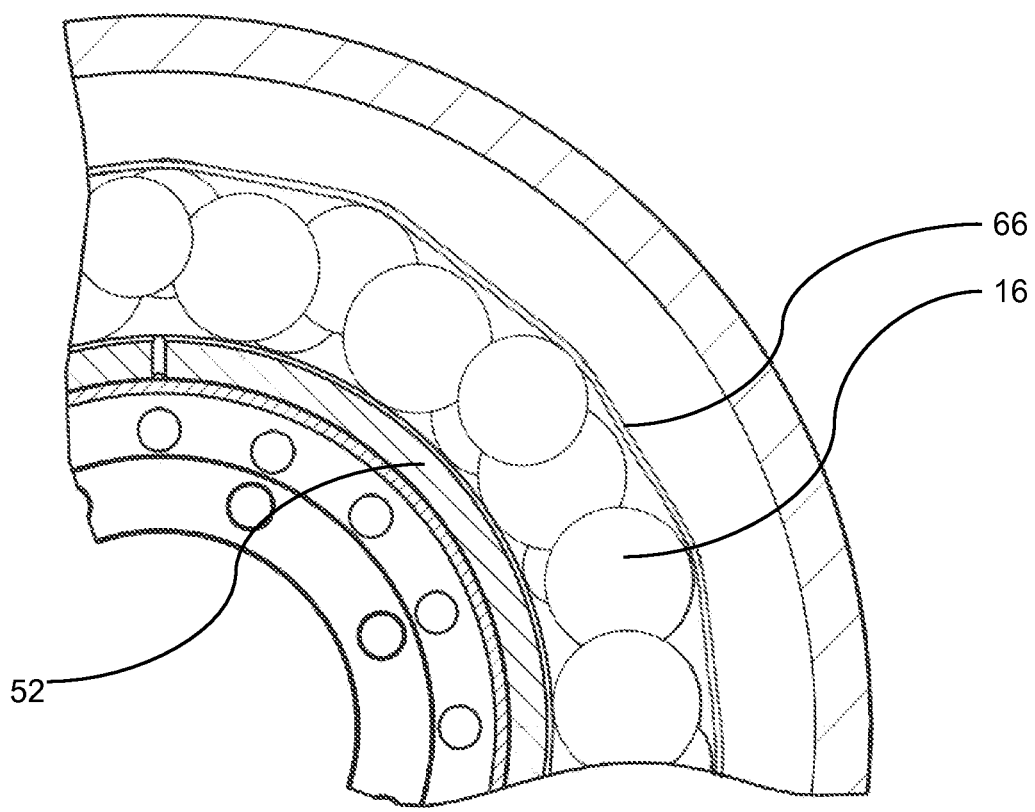

FIG. 6A illustrates yet other embodiments of the system 50 and FIG. 6B is a cross section of the system 50 of FIG. 6A. For purposes of simplicity, many of the details of the wheel 12 are not shown in FIG. 6B. The system 50 of FIG. 6A is similar to the system 50 shown in FIG. 3A in that it includes a wheel 12, a tire 14 and a plurality of pressurized load cells 16, but is different in several ways.

First, in lieu of the substantially continuous ring of pressurized load cells 16 as shown, for example, in FIG. 3B, the system 50 of FIGS. 6A and 6B includes pressurized load cells 16 which are smaller than the pressurized load cells 16 of the system 50 of FIG. 3A and are placed in a more random arrangement (within the webbed net member 66) to partially fill the tire cavity 40. In other words, for the embodiments of FIGS. 6A and 6B, the pressurized load cells 16 only partially fill the tire cavity 40. The pressurized load cells of the system 50 of FIGS. 6A and 6B may be of any suitable shape. Therefore, although spherical-shaped pressurized load cells 16 are shown in FIGS. 6A and 6B, it will be appreciated that other shapes (e.g., elliptical) may be utilized. According to various embodiments, the pressurized load cells 16 are all the same size. According to other embodiments, some of the pressurized load cells 16 may be sized and/or shaped differently than other of the pressurized load cells 16.

Second, in lieu of the tube or sleeve member 42 (with or without the reinforcing band 54), the system 50 includes a webbed net member 66 to help to constrain the position of the pressurized load cells 16 relative to the other components of the system 50. The webbed net member 66 is configured as a netting or mesh with open spaces between adjacent webbing. The webbed net member 66 provides the same type of functionality of the tube or sleeve member 42 and thus may be considered to be another embodiment of the tube or sleeve member 42.

Figure 7A:
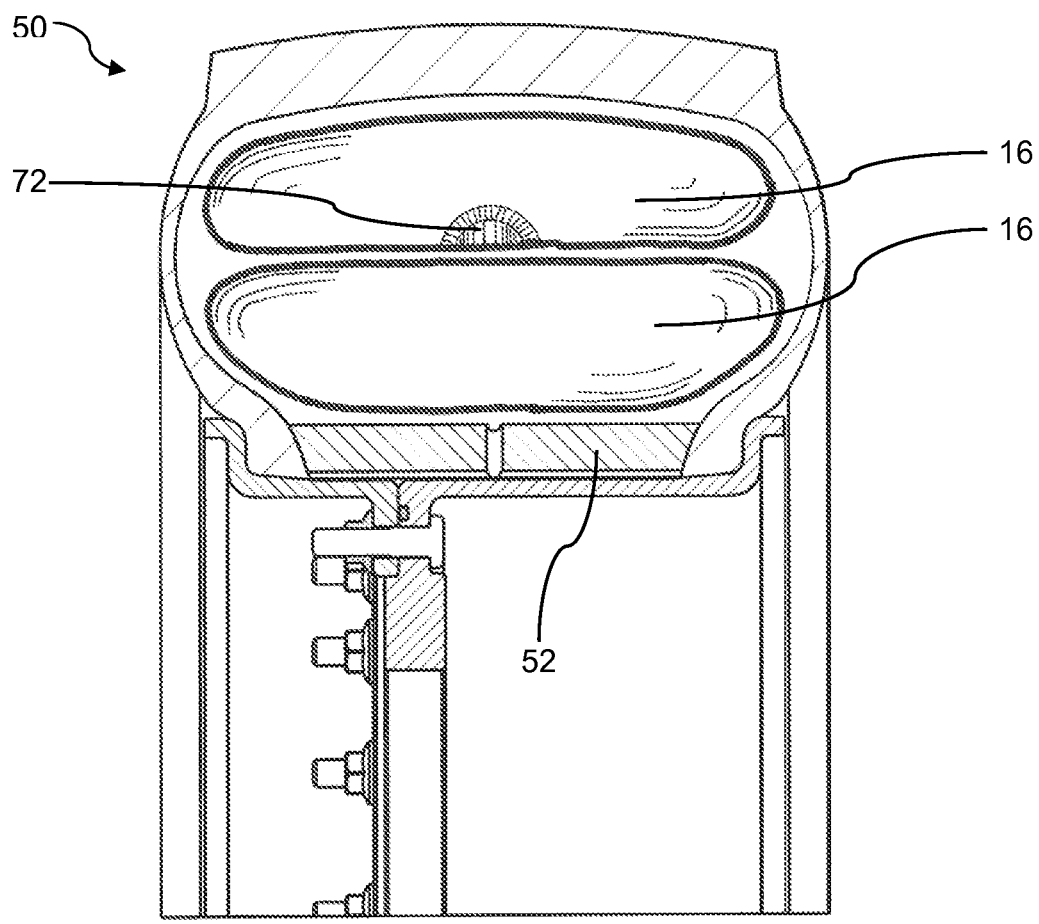
FIGS. 7A and 7B illustrate yet other embodiments of a system which includes a bead lock and pressurized load cells.
Figure 7B:
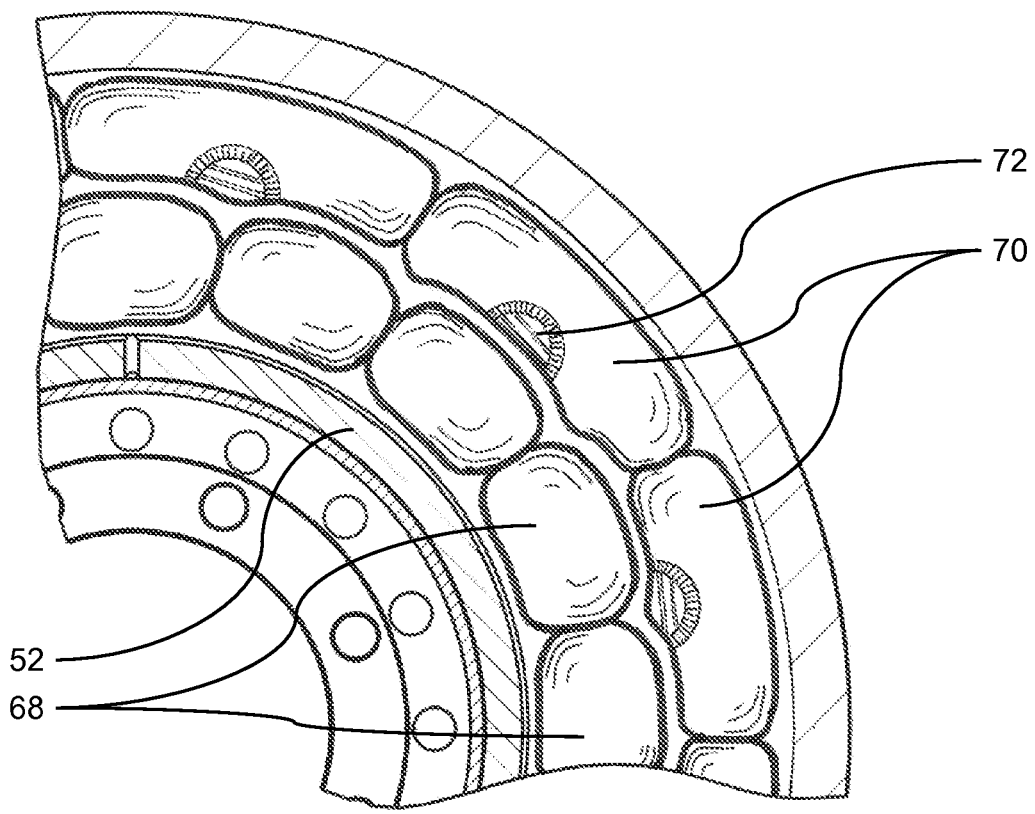

FIG. 7A illustrates yet other embodiments of the system 50 and FIG. 7B is a cross section of the system 50 of FIG. 7A. For purposes of simplicity, many of the details of the wheel 12 are not shown in FIG. 7B. The system 50 of FIG. 7A is similar to the system 50 shown in FIG. 2A in that it includes a wheel 12, a tire 14 and a plurality of pressurized load cells 16, but is different in several ways.

First, instead of a single substantially continuous ring of pressurized load cells 16 which extends from the bead lock 52 toward the radially outermost surface of the interior surface 28 of the tire 14 and substantially fills the tire cavity 40, the system 50 of FIGS. 7A and 7B includes (1) a first substantially continuous ring 68 (see FIG. 7B) of pressurized load cells 16 which is positioned radially outward from the bead lock 52 and only partially fills the tire cavity 40 and (2) a second substantially continuous ring 70 (See FIG. 7B) of pressurized load cells 16 which is positioned radially outward from the first substantially continuous ring 70 of pressurized load cells 16 (and thus has a larger radius than the first substantially continuous ring 68) and only partially fills the tire cavity 40. Collectively, the bead lock 52 and the first and second substantially continuous rings 68, 70 cooperate to substantially fill the tire cavity 40. According to other embodiments, in lieu of the concentric substantially continuous ring arrangement, the pressurized load cells 16 may be distributed equally inside the tire cavity 40 and around the circumference of the wheel 12 in a paddle wheel pattern where there is a spacing (e.g., a fixed spacing) between adjacent pressurized load cells 16.

Second, the system 50 of FIGS. 7A and 7B also includes valve members 72 which are fluidically connected to the pressurized load cells 16 of the second substantially continuous ring 70 (e.g., one valve member 72 per pressurized load cell 16 as shown in FIG. 7B) and operate to modulate the pressure of the pressurized load cells 16 of the second substantially continuous ring 70 relative to the tire pressure in the tire cavity 40. By allowing for the adjustment of the air pressure in the pressurized load cells 16 of the second substantially continuous ring 70, the mobility and performance of the tire 14 can be customized for various terrains. For example, tire flotation, traction and/or mobility can be increased by reducing the tire pressure. According to various embodiments, the valve members 72 may be embodied as integrated diaphragm valves. With the above-described arrangement, the pressurized loads cells 16 of the first substantially continuous ring 68 are constrained radially inward by the bead lock 52 and radially outward by the pressurized load cells 16 of the second substantially continuous ring 70.

Figure 8A:
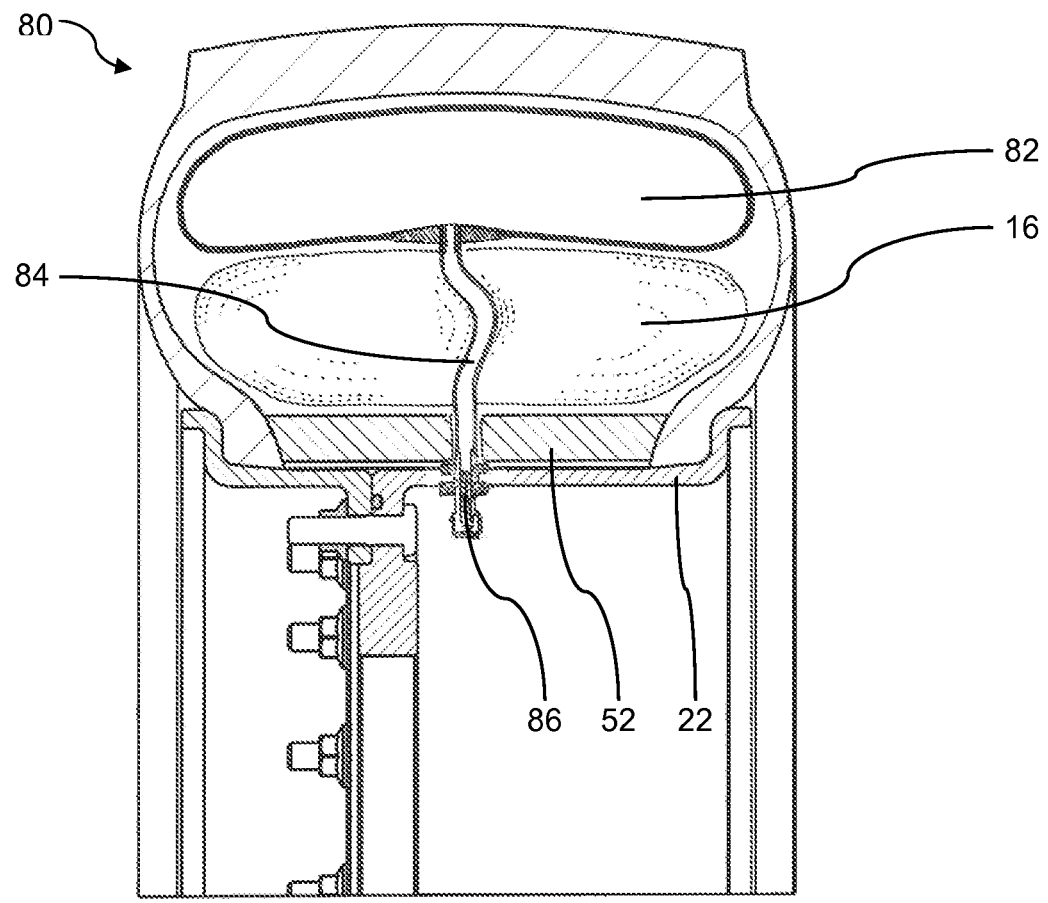
FIGS. 8A and 8B illustrate various embodiments of a system which includes a bead lock, pressurized load cells and a pressurized bladder member.
Figure 8B:
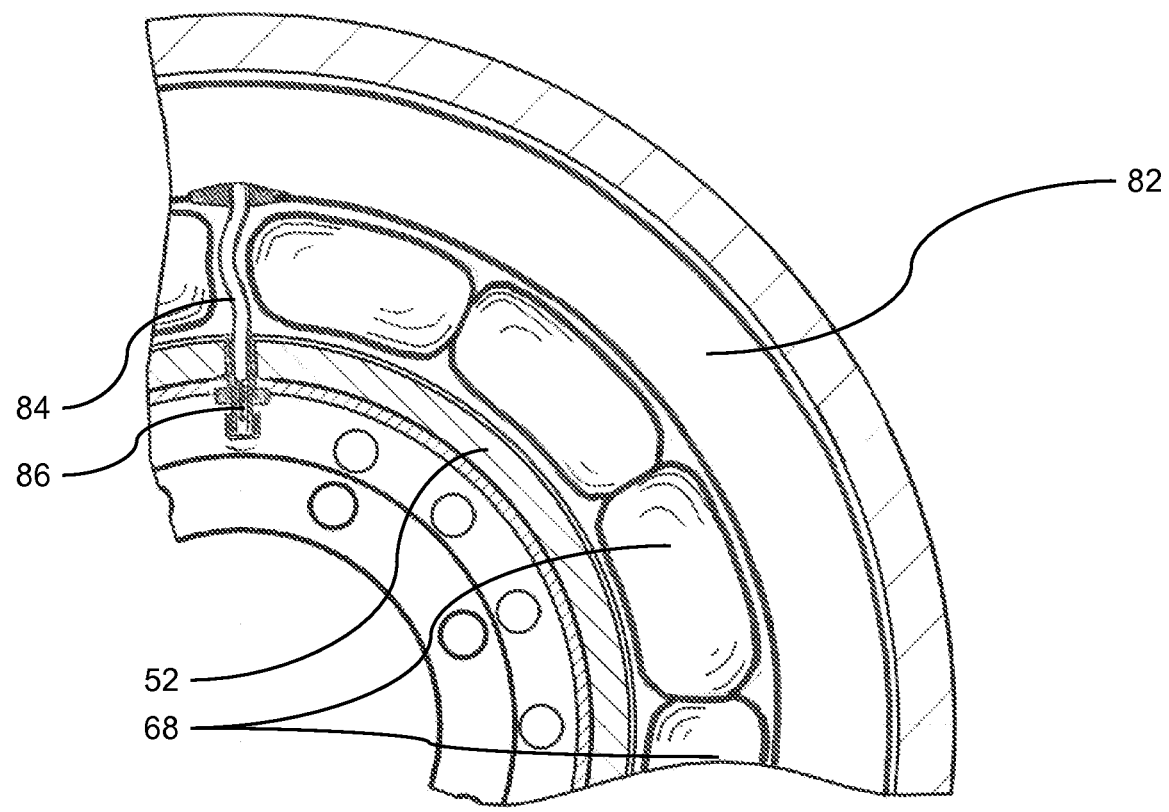

FIG. 8A illustrates various embodiments of a system 80 and FIG. 8B is a cross section of the system 80 of FIG. 8A. For purposes of simplicity, many of the details of the wheel 12 are not shown in FIG. 8B. The system 80 is similar to the system 50 shown in FIG. 7A in that it includes a wheel 12, a tire 14 and a plurality of pressurized load cells 16, but is different in several ways.

First, instead of including the second substantially continuous ring 70 of pressurized load cells 16, the system 80 includes a pressurized bladder member 82 which is utilized to constrain the first substantially continuous ring 68 of pressurized load cells 16 in the outward radial direction. Collectively, the bead lock 52, the first substantially continuous ring 68 of pressurized load cells 16, and the pressurized bladder member 82 cooperate to substantially fill the tire cavity 40.

Second, the system 80 also includes a valve member 86 which is fluidically connected to the pressurized bladder member 82 and is positioned external to the tire cavity 40 on (or within) the wheel 12. The valve member 86 may be any suitable type of valve member. For example, according to various embodiments, the valve member 86 is a standard inflate/deflate valve which allows the pressurized bladder member 82 to be inflated or deflated.

Third, the system 80 also includes a hose member 84 connected to the valve member 86 and the pressurized bladder member 82. As the pressurized bladder member 82 is more radially outward than the pressurized load cells 16, it will be appreciated that the hose member 84 passes by at least one of the pressurized load cells 16 to reach the pressurized bladder member 82. With the above-described arrangement, the air pressure in the pressurized bladder member 82 can be adjusted from an external source via the valve member 86 and the hose member 84. By allowing for the adjustment of the air pressure in the pressurized bladder member 82, the mobility and performance of the tire 14 can be customized for various terrains.

According to other embodiments of the system 80, a single piece wheel can be utilized in lieu of the two-piece wheel 12 shown in FIG. 8A, and the bead lock 52 can be eliminated.

Figure 9A:
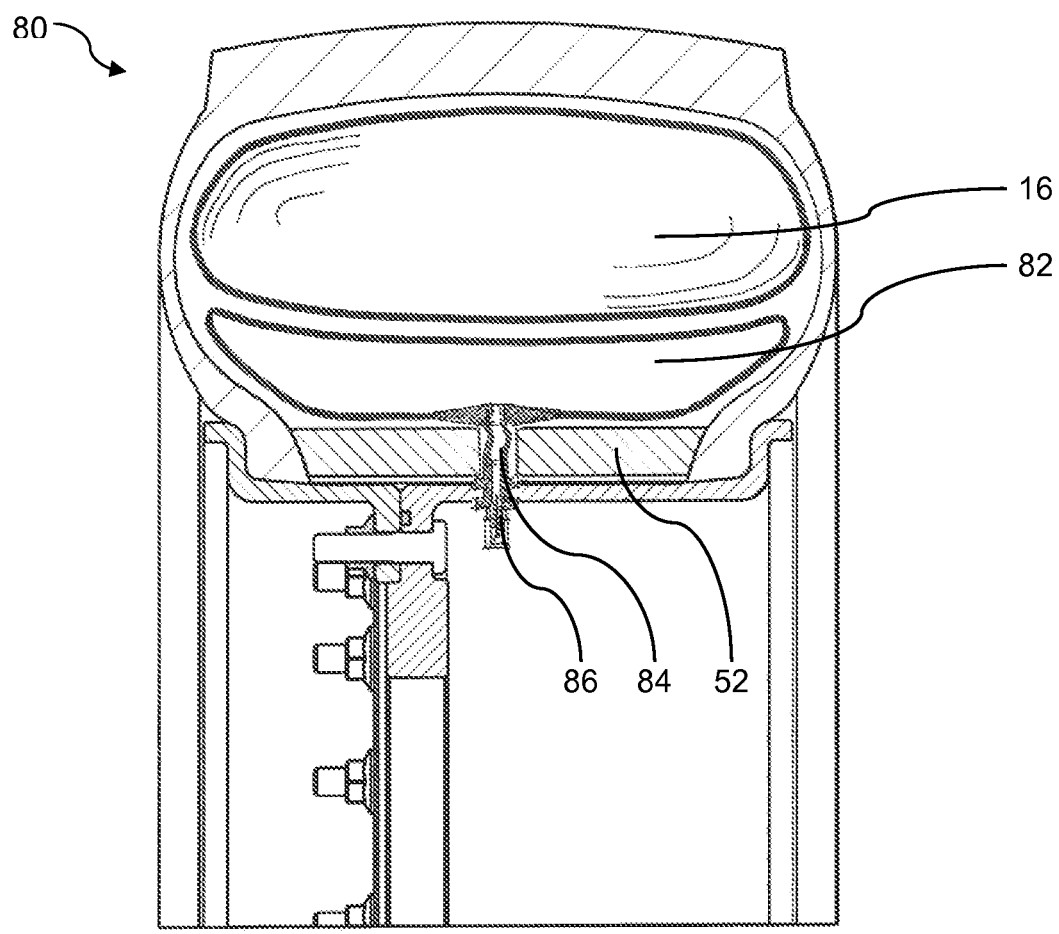
FIGS. 9A and 9B illustrate other embodiments of a system which includes a bead lock, pressurized load cells and a pressurized bladder member.
Figure 9B:
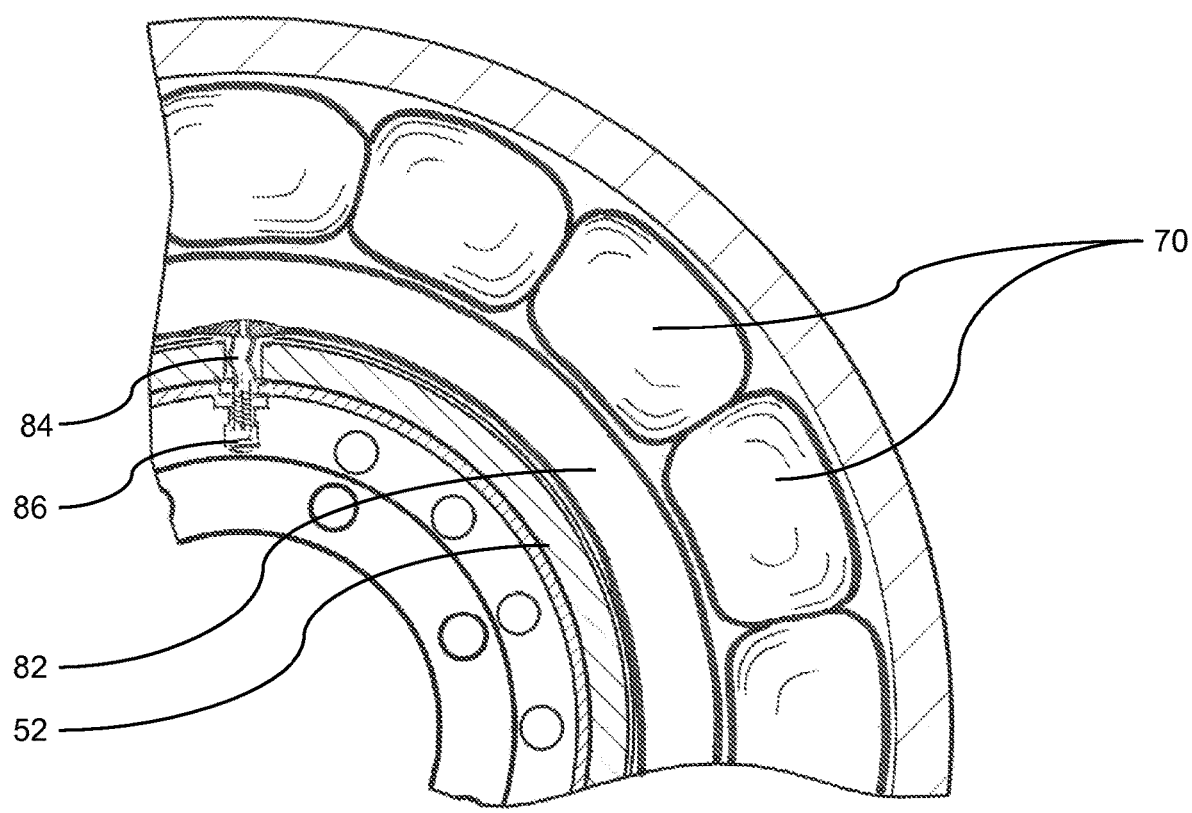

FIG. 9A illustrates other embodiments of the system 80 and FIG. 9B is a cross section of the system 80 of FIG. 9A. For purposes of simplicity, many of the details of the wheel 12 are not shown in FIG. 9B. The system 80 of FIGS. 9A and 9B is similar to the system 80 shown in FIG. 8A, but is different in that the relative positions of the pressurized load cells 16 and the pressurized bladder member 82 are reversed. In the system 80 of FIGS. 9A and 9B, the pressurized bladder member 82 is positioned radially outward from the bead lock 52, and the pressurized load cells 16 are positioned radially outward from the pressurized bladder member 82 in a substantially continuous ring 70 (and thus has a larger radius than the pressurized bladder member 82). Also, because the pressurized bladder member 82 is more radially inward than the pressurized load cells 16, the hose member 84 can extend directly to the pressurized bladder member 82 without passing by any of the pressurized load cells 16.

Although various embodiments have been described herein, many modifications, variations, substitutions, changes and equivalents to those embodiments may be implemented and will occur to those skilled in the art. For example, wheels other than those shown in the respective Figures may be utilized, the bead lock 52 may be eliminated from certain embodiments, the reinforcing band 54 may be added to certain embodiments, etc. Similarly, the arrangement of the pressurized load cells 16 can be other than a substantially continuous ring for any of the embodiments. For example, as described herein, the pressurized load cells 16 can be distributed equally inside the tire cavity 40 and around the circumference of the wheel 12 in a paddle wheel pattern where there is a spacing (e.g., a fixed spacing) between adjacent pressurized load cells 16. Also, where materials are disclosed for certain components, other materials may be used. It is therefore understood that the foregoing description and the appended claims are intended to cover all such modifications and variations as falling within the scope of the disclosed embodiments. The following claims are intended to cover all such modifications and variations.

What is claimed is:

1. A system, comprising:
a multi-piece wheel, wherein the multi-piece wheel comprises:
a first piece comprising a first flange portion;
a second piece comprising a second flange portion, wherein the first piece is connected to the second piece; and
a barrel portion positioned between the first and second flange portions;
a tire mounted to the wheel, wherein the wheel and the tire cooperate to define a tire cavity, and wherein the tire comprises:
a first beaded portion; and
a second beaded portion;
an assembly comprising a beadlock and a plurality of pressurized load cells connected to and in contact with the beadlock, wherein:
the assembly is positioned within the tire cavity;
the beadlock is in contact with the multi-piece wheel and the first and second beaded portions of the tire; and
a first one of the pressurized load cells is in contact with a second one of the pressurized load cells; and
a sleeve member positioned within the tire cavity so as to be positioned radially outward from the beadlock, the sleeve member being attached to the beadlock by a first sleeve member beaded portion and a second sleeve member beaded portion, the sleeve member being permanently attached to each of the plurality of pressurized load cells, wherein the combination of the beadlock and the sleeve member surrounds and constrains the plurality of pressurized load cells,
wherein a combination of the sleeve member and the assembly comprising the beadlock and the plurality of pressurized load cells partially fills the tire cavity, and a remainder of the tire cavity is an inflatable air chamber.

2. The system of claim 1 wherein the plurality of pressurized load cells comprise a continuous ring of pressurized load cells positioned around a circumference of the wheel.

* * * * *